(12) United States Patent
Harris et al.

(10) Patent No.: US 8,791,900 B2
(45) Date of Patent: Jul. 29, 2014

(54) COMPUTING DEVICE NOTES

(75) Inventors: Jonathan R. Harris, Redmond, WA (US); Andrew S. Allen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 12/784,803

(22) Filed: May 21, 2010

(65) Prior Publication Data

US 2011/0285638 A1    Nov. 24, 2011

(51) Int. Cl.
*G06F 3/041*    (2006.01)

(52) U.S. Cl.
USPC .......................................... 345/156; 345/173

(58) Field of Classification Search
USPC .................................. 345/156, 173
See application file for complete search history.

(56) References Cited

U.S. PATENT DOCUMENTS

| | | | |
|---|---|---|---|
| 5,590,256 A | 12/1996 | Tchao et al. | |
| 5,592,607 A | 1/1997 | Weber et al. | |
| 5,852,436 A | 12/1998 | Franklin et al. | |
| 6,970,266 B2 | 11/2005 | Matthews et al. | |
| 7,793,233 B1 * | 9/2010 | Sellers et al. | 715/805 |
| 2003/0107593 A1 | 6/2003 | Domenico | |
| 2003/0204567 A1 | 10/2003 | Martino et al. | |
| 2004/0135814 A1 * | 7/2004 | Vendelin, Jr. | 345/802 |
| 2005/0076300 A1 | 4/2005 | Martinez | |
| 2007/0239831 A1 | 10/2007 | Basu | |
| 2009/0228842 A1 | 9/2009 | Westerman et al. | |
| 2009/0327890 A1 | 12/2009 | Mertz et al. | |

FOREIGN PATENT DOCUMENTS

| | | |
|---|---|---|
| KR | 20090042740 | 4/2009 |
| KR | 20090102135 | 9/2009 |

OTHER PUBLICATIONS

"Editing a Project", *BSD Speclink User Manual*, Available at <http://www.bsdsoftlink.com/support/speclink/05-edit.pdf>,(Aug. 2008),pp. 125-168.
"Open Office", Retrieved from: <http://qa.openoffice.org/issues/show_bug.cgi?id=5487> on Aug. 9, 2010, (Oct. 6, 2007),4 pages.
"PCT Search Report and Written Opinion", Application No. PCT/US2011/037073, (Oct. 31, 2011), 8 pages.

* cited by examiner

*Primary Examiner* — Jonathan Boyd
(74) *Attorney, Agent, or Firm* — Micah Goldsmith; Glen Johnson; Micky Minhas

(57) ABSTRACT

Computing device note techniques are described. In implementations, an input is recognized as selecting at least one object displayed in a user interface by a display device of a computing device. Responsive to the recognition, an indication is displayed on the display device that is selectable. Responsive to selection of the indication, a portion is displayed by the computing device that is configured to accept one or more inputs as a note to be associated with the at least one object.

20 Claims, 6 Drawing Sheets

COMPUTING DEVICE NOTES

BACKGROUND

The amount of functionality that is available from computing devices is ever increasing, such as from mobile devices, game consoles, televisions, set-top boxes, personal computers, and so on. However, traditional techniques that were employed to interact with the computing devices may become less efficient as the amount of functionality increases.

For example, inclusion of additional functions in a menu may add additional levels to the menu as well as additional choices at each of the levels. Additionally, inclusion of these features using traditional techniques may force the user to navigate through menus to access the features "away" from the current user interface. Consequently, the addition of these functions in the menu may frustrate users by the sheer number of choices of functions and thereby result in decreased utilization of both the additional functions as well as the device itself that employs the functions. Thus, traditional techniques that were used to access the functions may limit the usefulness of the functions and the device as a whole to a user of the computing device.

SUMMARY

Computing device note techniques are described. In implementations, an input is recognized as selecting at least one object displayed in a user interface by a display device of a computing device. Responsive to the recognition, an indication is displayed on the display device that is selectable. Responsive to the selection of the indication, a portion is displayed by the computing device that is configured to accept one or more inputs as a note to be associated with the at least one object.

In implementations, an input is recognized as movement over characters displayed in a user interface by a display device of a computing device. A line is displayed in the user interface that corresponds to the movement. Responsive to the recognition, selection of the characters is indicated by changing display characteristics of the characters. A portion is displayed in the user interface by the computing device that is configured to accept one or more inputs as a note to be associated with at least the characters associated with the movement.

In implementations, a computing device includes a first housing having a first display device disposed therein and a second housing physically coupled to the first housing, the second housing having a second display device disposed therein. One or more modules disposed within at least one of the first or second housings, the one or more modules configured to responsive to recognition of an input selecting an objected displayed on the first display device, display an indication that is selectable proximal to the object and responsive to selection of the indication, display a portion on the second display device that is configured to accept one or more inputs as a note to be associated with the at least one object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional functionality of a computing device was often accessed using a menu, which may contain a variety of hierarchical levels as well as a variety of choices at each of the levels. Accordingly, access to these functions may interrupt a user's interaction with the computing device.

Computing device note techniques are described. In implementations, a user may select an object displayed by a display device of a computing device, such as by highlighting a section of text or other object using a stylus. Responsive to this selection, an indication is output that is selectable to cause a portion to be displayed that is configured to work as a note. A user may then enter text (e.g., handwritten using the stylus) or other data into the portion, which is associated with the text, such as for display with the text, display when the text is selected, and so on. Thus, through automatic display both the indication and the note may be accessed without navigating through one or more menus to locate the function. Further, the indication may "time out" so as not to obstruct the user's view of an underlying user interface. Further discussion of this and other examples of computing device notes may be found in relation to the following sections.

In the following discussion, an example environment is first described that is operable to employ the computing device note techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
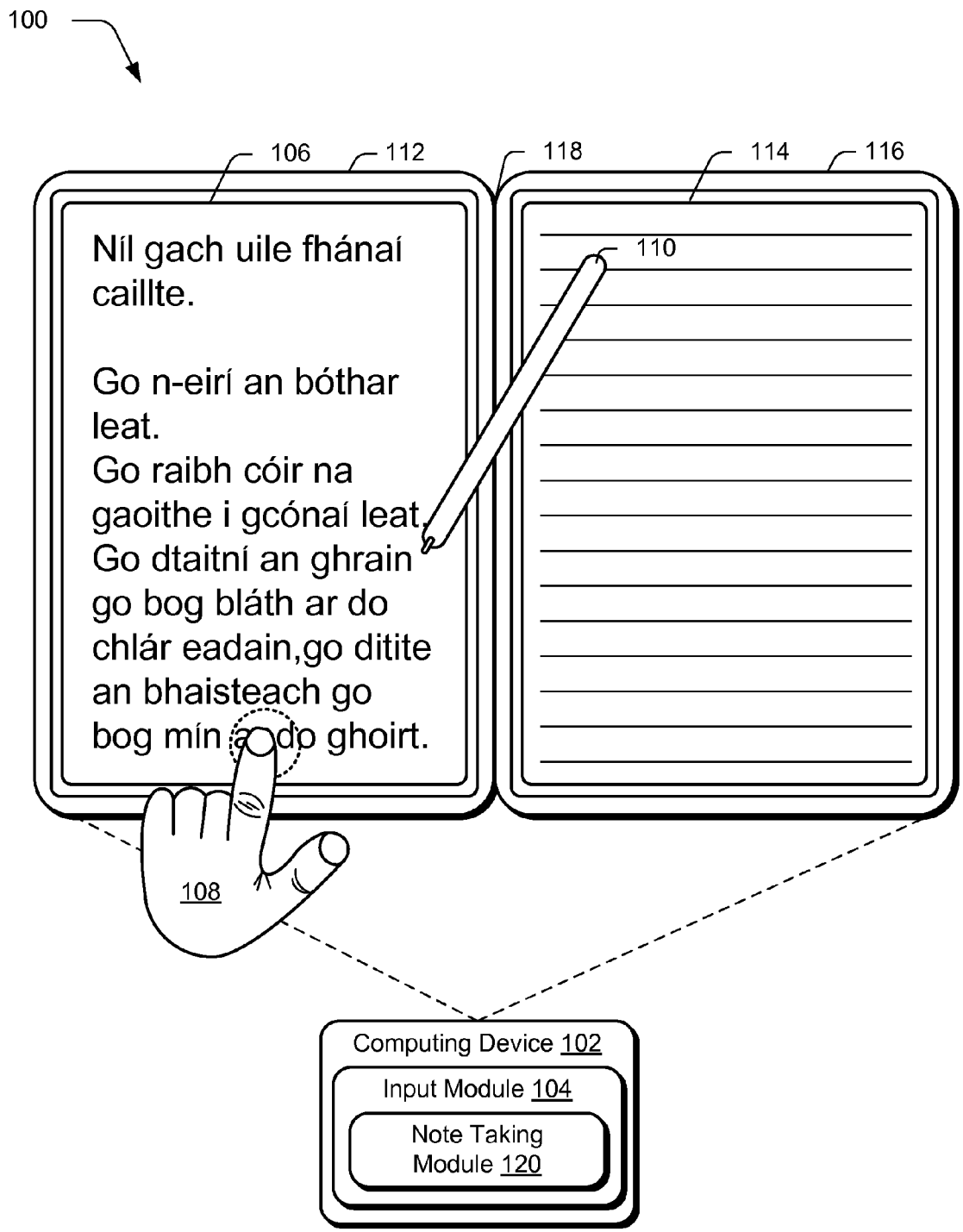
FIG. 1 is an illustration of an environment in an example implementation that is operable to employ computing device note techniques described herein.

FIG. 1 is an illustration of an environment 100 in an example implementation that is operable to employ computing device note techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input module 104. The input module 104 is representative of functionality relating to inputs of the computing device 102. For example, the input module 104 may be configured to receive inputs from a keyboard, mouse, to identify gestures and cause operations to be performed that correspond to the gestures, and so on. The inputs may be identified by the input module 104 in a variety of different ways.

For example, the input module 104 may be configured to recognize an input received via touchscreen functionality of a display device 106, such as a finger of a user's hand 108 as proximal to the display device 106 of the computing device 102, from a stylus 110, and so on. The input may take a variety of different forms, such as to recognize movement of the stylus 110 and/or a finger of the user's hand 108 across the display device 106, such as a tap, drawing of a line, and so on. In implementations, these inputs may be recognized as gestures.

A variety of different types of gestures may be recognized, such a gestures that are recognized from a single type of input (e.g., touch gestures) as well as gestures involving multiple types of inputs. For example, the computing device 102 may be configured to detect and differentiate between a touch input (e.g., provided by one or more fingers of the user's hand 108) and a stylus input (e.g., provided by a stylus 110). The differentiation may be performed in a variety of ways, such as by detecting an amount of the display device 108 that is contacted by the finger of the user's hand 108 versus an amount of the display device 106 that is contacted by the stylus 110. Differentiation may also be performed through use of a camera to distinguish a touch input (e.g., holding up one or more fingers) from a stylus input (e.g., holding two fingers together to indicate a point) in a natural user interface (NUI). A variety of other example techniques for distinguishing touch and stylus inputs are contemplated, further discussion of which may be found in relation to FIG. 6.

Thus, the input module 104 may support a variety of different gesture techniques by recognizing and leveraging a division between stylus and touch inputs. For instance, the input module 104 may be configured to recognize the stylus as a writing tool, whereas touch is employed to manipulate objects displayed by the display device 108. Consequently, the combination of touch and stylus inputs may serve as a basis to indicate a variety of different gestures. For instance, primitives of touch (e.g., tap, hold, two-finger hold, grab, cross, pinch, hand or finger postures, and so on) and stylus (e.g., tap, hold-and-drag-off, drag-into, cross, stroke) may be composed to create a space involving a plurality of gestures. It should be noted that by differentiating between stylus and touch inputs, the number of gestures that are made possible by each of these inputs alone is also increased. For example, although the movements may be the same, different gestures (or different parameters to analogous commands) may be indicated using touch inputs versus stylus inputs.

Additionally, although the following discussion may describe specific examples of touch and stylus inputs, in instances the types of inputs may be switched (e.g., touch may be used to replace stylus and vice versa) and even removed (e.g., both inputs may be provided using touch or a stylus) without departing from the spirit and scope thereof. Further, although in instances in the following discussion the gestures are illustrated as being input using touchscreen functionality, the gestures may be input using a variety of different techniques by a variety of different devices.

The computing device 102 in this example is further illustrated as assuming a dual screen configuration. In the illustrated example, the computing device 102 includes the first display device 106, which is disposed in a first housing 112. The computing device 102 also has a second display device 114 disposed in a second housing 116. A binding system 118 is also included (a rotatable mechanism such as a hinge, pivot, and so on), which movably connects the first housing 112 to the second housing 114. In an embodiment, the binding system 118 can be implemented as a multi-axis hinge that movably connects the first housing 112 to rotate in at least two different directions relative to the second housing 114. Alternatively or in addition, the binding system 118 can include an internal drive mechanism to position the first housing 112 and/or the second housing 114 in one or more various display postures, the example of which is a "flat" posture such that the first and second housings 112, 114 may be positioned when laid on a surface. Alternatively or in addition, the binding system 118 may also include passive mechanical positioned detents to retain the two halves in various relative postures as further described below.

The computing device 102 is further illustrated as including a note taking module 120. The note taking module 120 is representative of functionality of the computing device 102 relating to computing device note techniques. For example, the note taking module 120 may be configured to output a portion that is configured to accept one or more notes (e.g., comments or other data) responsive to selection of an object that is displayed in a display device of the computing device 102. In this way, the note functionality may be accessed without navigating through menus, input of one or more key combinations, and so on, further discussion of which may be found in relation to the following computing device note implementation example.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the computing device note techniques described below are platform-independent, meaning that the techniques may be implemented on a variety of commercial computing platforms having a variety of processors.

Computing Device Note Implementation Example

Figure 2:
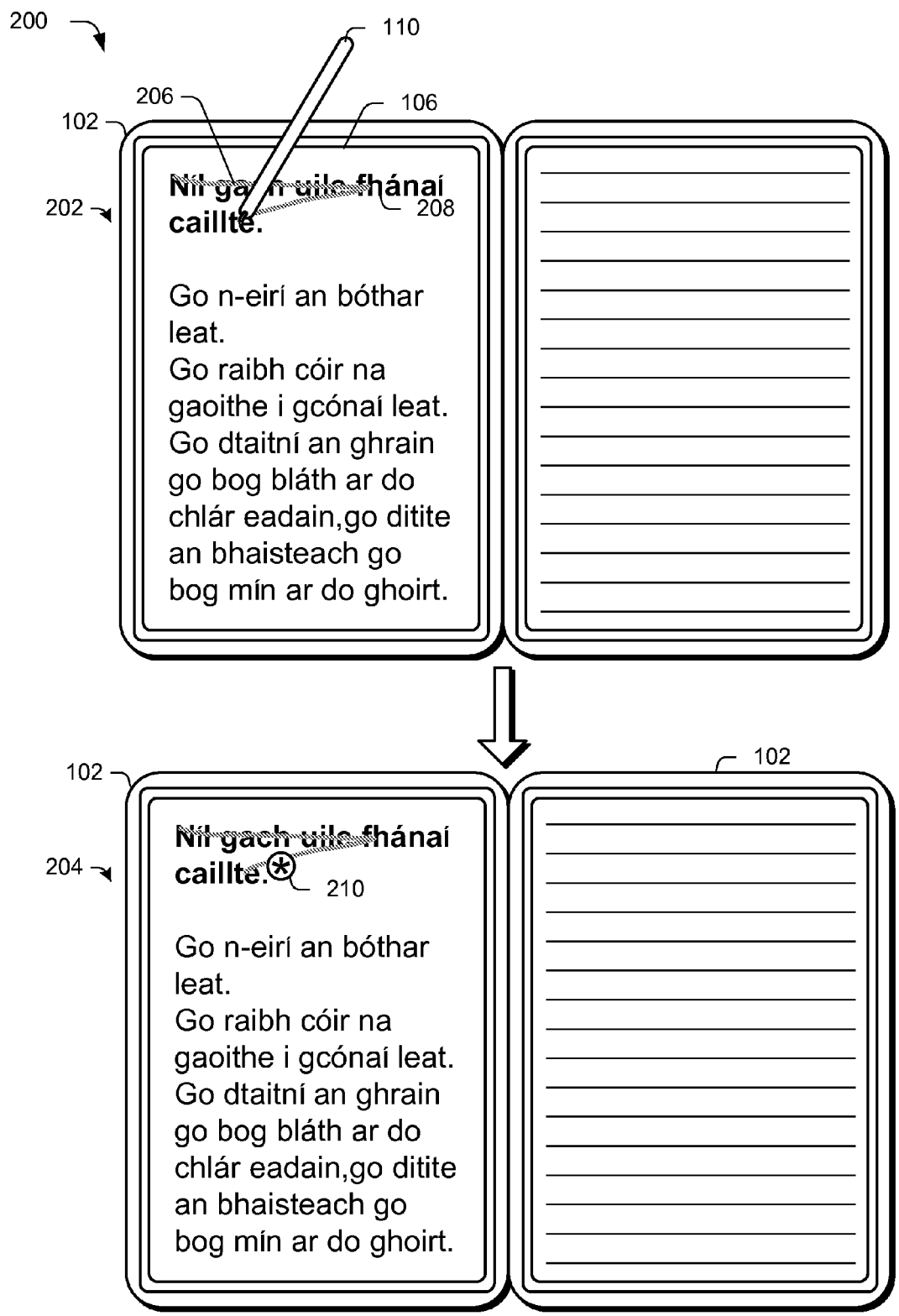
FIG. 2 depicts a system in an example implementation showing selection of an object and output of an indication responsive to the selection in relation to a computing device of FIG. 1, the indication selectable to output a portion to accept one or more inputs as a note.

FIG. 2 depicts a system 200 in an example implementation showing selection of an object and output of an indication responsive to the selection, the indication selectable to output a portion to accepts one or more inputs as a note. The system 200 of FIG. 2 is illustrated as including first and second stages 202, 204. In these examples, highlighter functionality has been selected for the stylus 110 to highlight objects, although other functionality is also contemplated, e.g., such as to underline objects, circle objects, and so on.

At the first stage 202, the first display device 106 is illustrated as outputting a Gaelic book. The stylus 110 is illustrated as having moved across a surface of the first display device 106 to select characters of the book. This movement is also illustrated as causing display of a line 206 by the display device to show the movement, e.g., the line 206 may be drawn in real time to follow the movement of the stylus 110. Although a stylus 110 is shown, it should be readily apparent that a variety of other inputs may be recognized (e.g., by touchscreen functionality of the computing device 102), such as a touch input from a user's hand 108 as previously described.

Text 208 that corresponds to the movement is also indicated as selected through bolding of the text. In implementations, the computing device 102 may employ functionality to determine what is to be included in the object selected. For example, the line 206 illustrated in the first step 202 is shown as selecting a letter "e" in the Gaelic word "caillte." However, responsive to this selection the computing device (through the note taking module 120) may determine that the word "caillte" is to be selected as part of the text 208, even though other letters of the word are not disposed "beneath" the line 206 drawn by the stylus 110.

At the second stage 204, an indication 210 is illustrated as being disposed proximal to the selected object, e.g., the text 208 in this instance. In implementations, the indication 210 is configured by the note taking module 120 to "time out" after a predetermined period of time if the indication 210 is not selected during that time. In this way, the indication 210 may provide an option to input a note without cluttering a user interface for an extended period of time. Further, this indication 210 may be output automatically and without further user intervention (e.g., past selection of the object) such that a user is not forced to navigate away from the current user experience. Selection of the indication 210 may then cause the user interface to be configured to provide a portion for a note, further discussion of which may be found in relation to the following figure.

Figure 3:
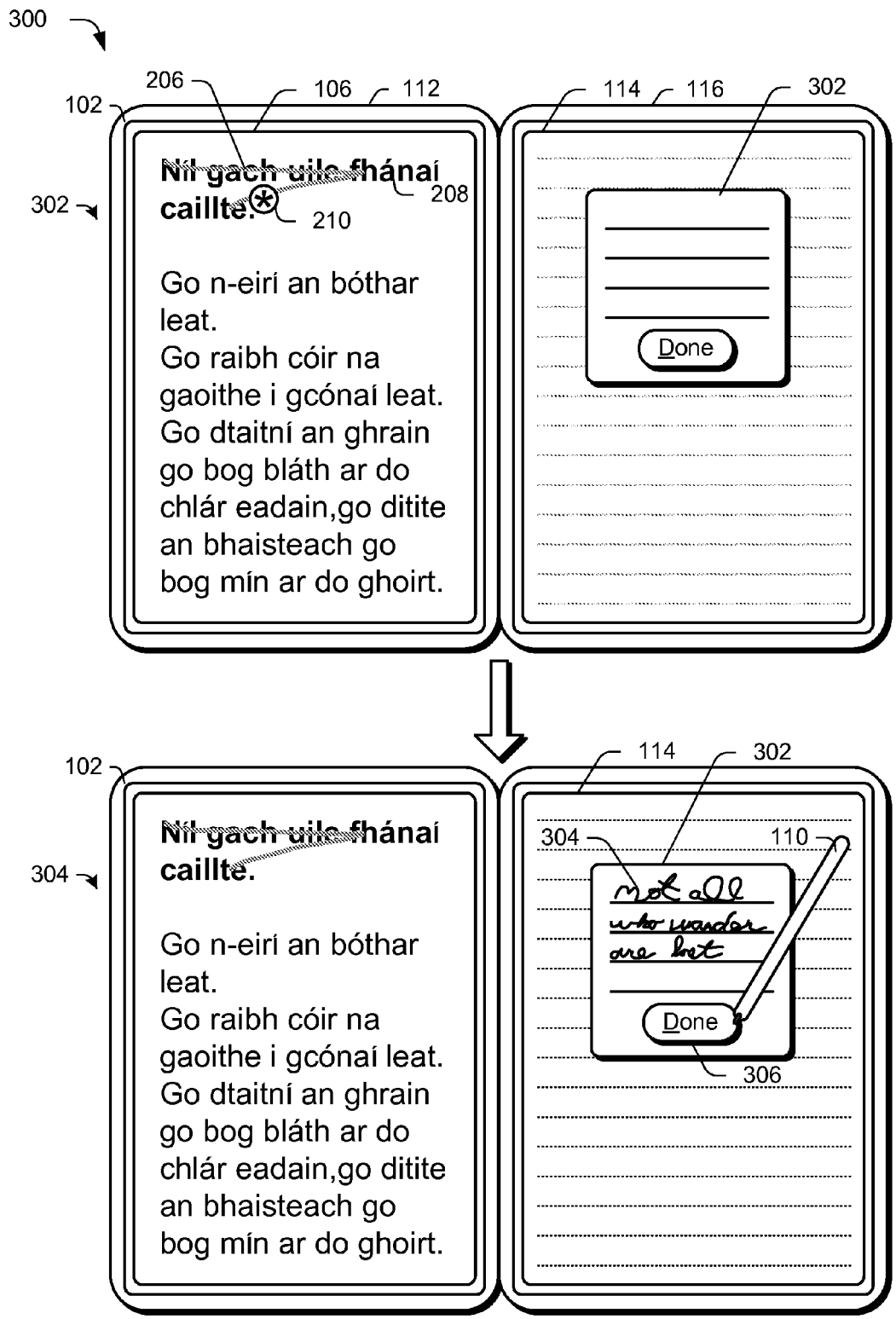
FIG. 3 depicts a system in an example implementation in which a portion is output that is configured to receive one or more inputs as a note in response to selection of the indication of FIG. 2.

FIG. 3 depicts a system 300 in an example implementation in which a portion is output in response to selection of the indication 210 of FIG. 2. The system 300 of FIG. 3 is also illustrated as including first and second stages 302, 304. At the first stage 302, a portion 302 is output on the second display device 114 of the second housing 116 responsive to selection of the indication 210 displayed in the first display device 106 of the first housing 112. The indication 210 may be selected in a variety of ways, such as by the stylus 110, a finger of the user's hand 108, and so on.

In implementations, selection of the indication 210 causes further display of the portion to cease, as shown in the second stage 304 of FIG. 3. However, it should be readily apparent that continued display of the indication 210 is also contemplated, such as to select subsequent output of the portion 302.

The portion 302 is configured to receive one or more inputs. As illustrated in the second stage 304 of FIG. 3, for instance, the stylus 110 is shown as providing handwritten freeform lines 304 that provide a translation for the selected Gaelic words. A variety of other data may also be captured by the portion 302, such as an image, link, keyboard inputs, drawings, and so on. The portion 302 also includes a section 306 (e.g., illustrated as a button saying "Done" in the figure) that is selectable to indicate that entry of inputs is complete. The portion 302 may then be saved as a note that is associated with the selected object.

Once saved, the note may be displayed in response to a variety of different situations. For example, display of the text 208 may automatically cause display of the note. In another example, the text 208 and/or the indication 210 may be selectable to cause display of the note. A variety of other examples are also contemplated.

The portion 302 is also illustrated as having focus. This is illustrated in FIG. 3 by displaying the portion 302 over a background having phantom lines (which is readily identifiable in comparison with FIG. 2). However, it should also be apparent that focus may be provided in a variety of different ways, such as by darkening the background "beneath" the portion 302, using different levels of opacity, and so on.

Figure 4:
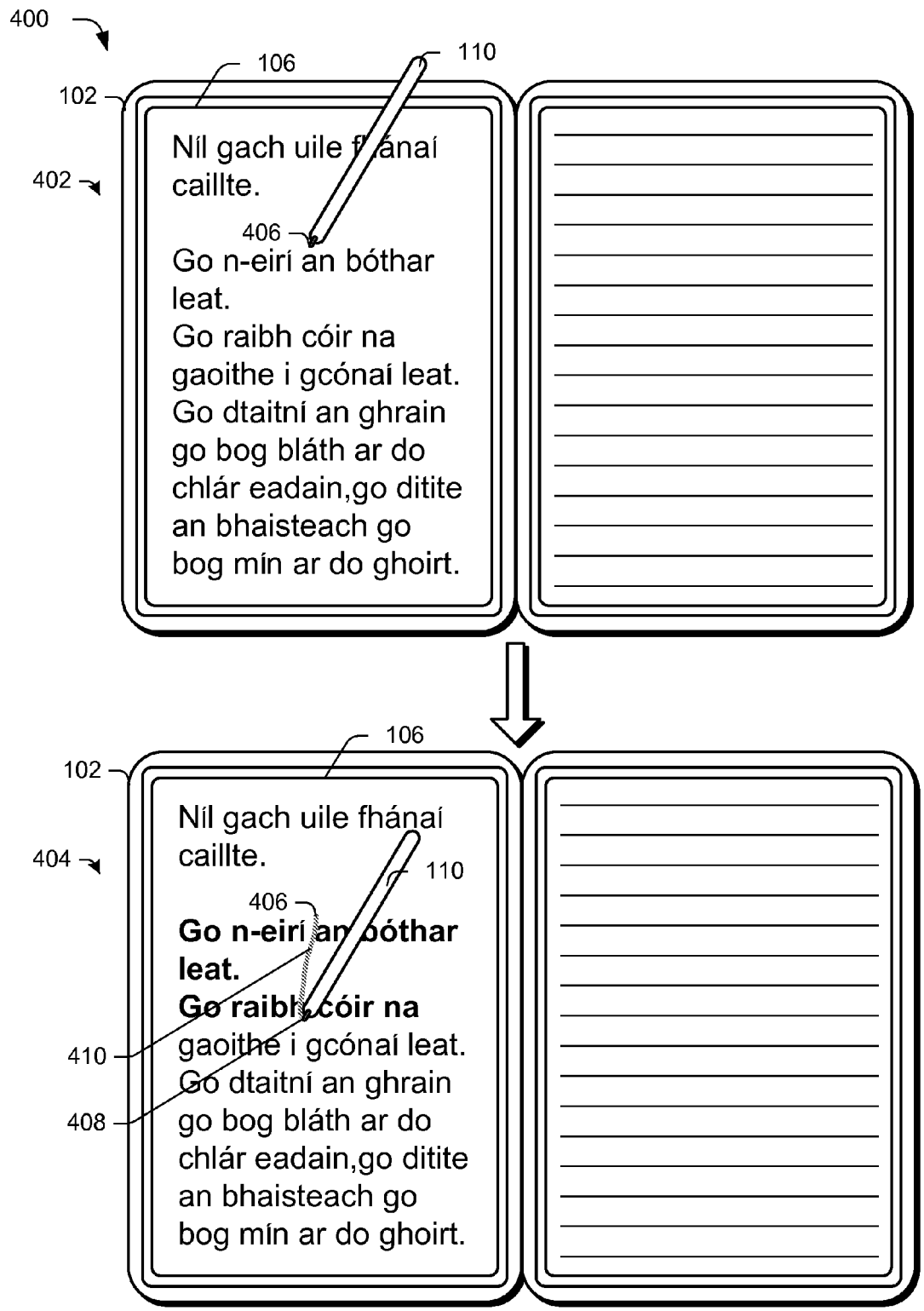
FIG. 4 depicts a system in an example implementation in which an input is recognized as selecting multiple rows of characters displayed on a display device of the computing device of FIG. 1.

FIG. 4 depicts a system 400 in an example implementation in which an input is recognized as selecting multiple rows of characters displayed on a display device of the computing device of FIG. 1. The system 400 of FIG. 4 is illustrated as including first and second stages 402, 404. At the first stage 402, the stylus 110 is shown at a first position 406 in relation to a user interface output by the computing device 102.

At the second stage 404, the stylus 110 is illustrated as having been moved from the first position 406 to a second position 408 in the user interface and as having a line 410 draw to indicate the movement of the stylus 110. In this implementation, the movement from the first position 406 to the second position 408 is recognized by the note taking module 120 as movement that intersects three rows of characters.

Accordingly, the note taking module 120 may ascertain the movement of the stylus 110 as selecting those rows. As before, this selection may be indicated in a variety of ways, such as through bolding the text as illustrated in the second stage 404. Thus, as previously described in relation to FIG. 2 selection of the object may be performed using logic of the note taking module 120 to include portions that are not disposed directly "beneath" the movement of an input device, e.g., the stylus 110, a finger of the user's hand 108, and so on.

In the examples systems 200-400 of FIGS. 2-4, a dual screen computing device 102 was described in which a document to be reviewed was displayed on a first display device 102 and notes input from the user were displayed on the second display device 114. It should be apparent, however, that a wide variety of configurations (e.g., a "slate," laptop, and so on) are also contemplated without departing from the spirit and scope thereof.

Example Procedures

The following discussion describes computing device note techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-400 of FIGS. 2-4.

Figure 5:
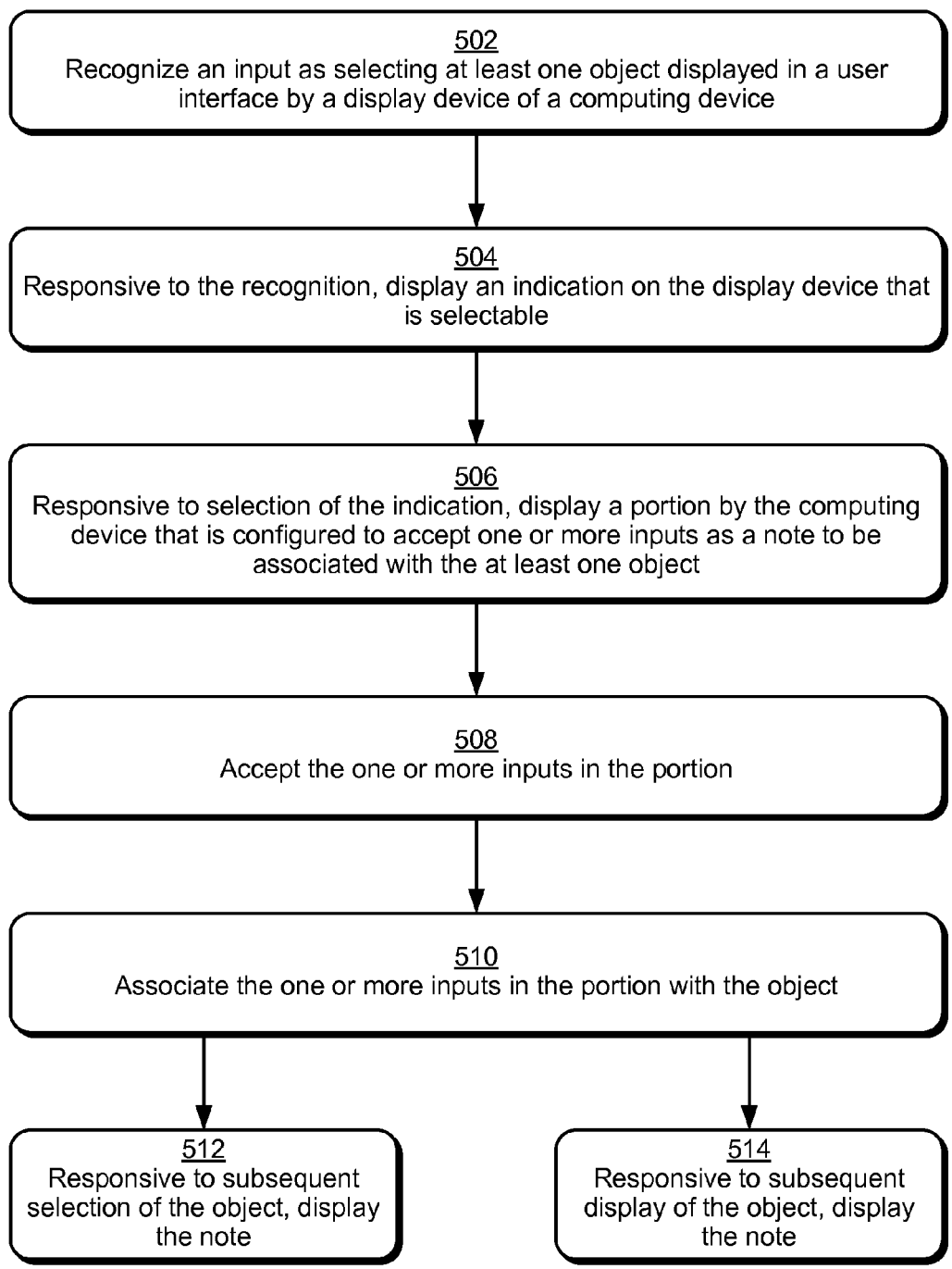
FIG. 5 is a flow diagram depicting a procedure in an example implementation in which computing device note techniques are performed that include output of an indication responsive to selection of an object, the indication selectable to output a portion that is configured to receive one or more inputs as a note to be associated with the object.

FIG. 5 depicts a procedure 500 in an example implementation in which computing device note techniques are performed that include output of an indication responsive to selection of an object, the indication selectable to output a portion that is configured to receive one or more inputs as a note to be associated with the object. An input is recognized as selecting at least one object displayed in user interface by a display device of a computing device (block 502). The object may be selected in a variety of ways. For example, highlighter functionality may be selected such that inputs received from the stylus 110 are highlighted in a user interface to mimic an ink highlighter. In another example, the object may be selected by circling the object, underlining the object, "clicking" on the object using a cursor control device, and so on.

Responsive to the recognition, an indication is displayed on the display device that is selectable (block 504). The indication 210, for instance, may be displayed proximal to the selected object. Further, the indication 210 may be output automatically and without user intervention responsive to recognition of the selection. In this way, the indication may be output without having the user navigate away from the current user experience in the user interface.

Responsive to selection of the indication, a portion is displayed by the computing device that is configured to accept one or more inputs as a note to be associated with the at least one object (block 506). The portion, for instance, may be displayed proximally to the indication, and consequently the selected object. In another instance, the portion may be displayed on another screen, such as on the second display device 114 as illustrated in FIG. 3.

The one or more inputs are accepted in the portion (block 508). As previously stated, the one or more inputs may take a variety of forms, such as handwritten freeform lines 304, inputs from a keyboard, images, lines, media files, and so on.

The one or more inputs in the portion are associated with the object (block 510). For example, the note may be displayed responsive to subsequent selection of the object (block 512). In another example the note may be displayed responsive to display of the object (block 514). A variety of other examples are also contemplated.

Example Device

Figure 6:
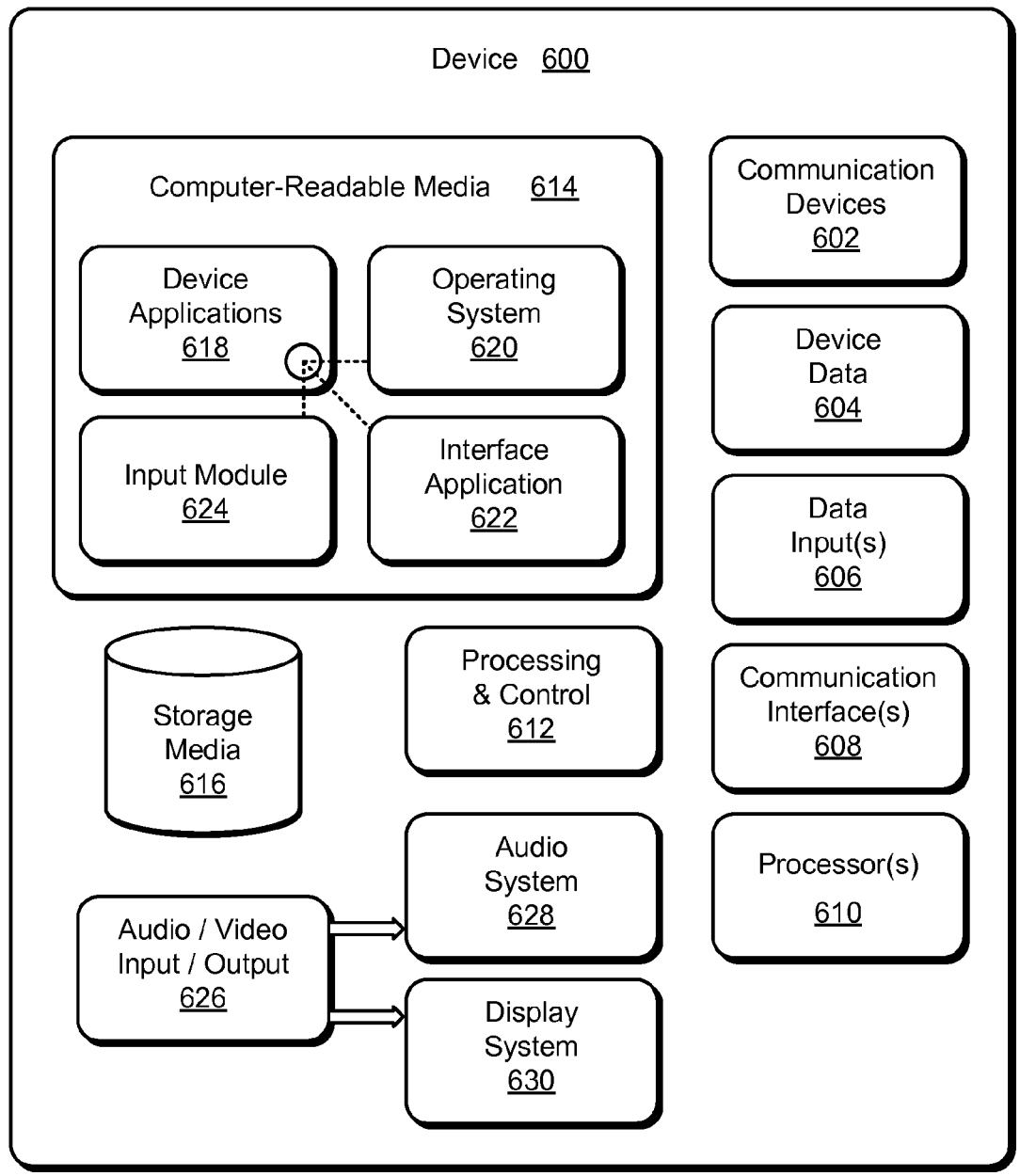
FIG. 6 illustrates various components of an example device that can be implemented as any type of portable and/or computer device as described with reference to FIGS. 1-4 to implement embodiments of the computing device note techniques described herein.

FIG. 6 illustrates various components of an example device 600 that can be implemented as any type of portable and/or computer device as described with reference to FIGS. 1 and 2 to implement embodiments of the gesture techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more o\f a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of a touch pull-in gesture. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the gesture techniques described herein. In this example, the device applications 618 include an interface application 622 and an input module 624 (which may be the same or different as input module 114) that are shown as software modules and/or computer applications. The input module 624 is representative of software that is used to provide an interface with a device configured to capture inputs, such as a touchscreen, track pad, camera, and so on. Alternatively or in addition, the interface application 622 and the input module 624 can be implemented as hardware, software, firmware, or any combination thereof. Additionally, the input module 624 may be configured to support multiple input devices, such as separate devices to capture touch and stylus inputs, respectively. For example, the device may be configured to include dual display devices, in which one of the display device is configured to capture touch inputs while the other stylus inputs.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   recognizing an input as selecting at least one object displayed in a user interface by a display device of a computing device and displaying a visible freeform line in the user interface that corresponds to the input selection of the at least one object;
   responsive to the recognizing, automatically displaying an indication on the display device that is selectable, the indication configured to cease displaying after a time-out period of time;
   responsive to selection of the indication, and prior to expiration of the time-out period of time, displaying a first portion by the computing device that is configured to accept one or more inputs as a note to be associated with the at least one object and a second portion selectable to indicate entry of the note is complete;
   responsive to selection of the second portion, saving the note as associated with the at least one object; and
   responsive to subsequent selection of the indication, causing the displaying of the first and second portions to be displayed again.

2. A method as described in claim 1, wherein the input is recognized as highlighting the at least one object.

3. A method as described in claim 2, wherein the at least one object includes one or more characters.

4. A method as described in claim 1, wherein the input is recognized as a touch input or a stylus input detected using touchscreen functionality.

5. A method as described in claim 1, wherein the at least one object includes a plurality of characters arranged as a word and the recognizing includes:
   detecting that the input describes a line drawn over one of the characters of the word but not another one of the characters of the word; and
   ascertaining the selection of the word from the detecting.

6. A method as described in claim 1, wherein the at least one object includes a plurality of rows of characters and the recognizing includes:
   detecting that the input describes a line drawn over at least one of the characters in a particular said row but not another one of the characters of the particular said row; and
   ascertaining the selection of the particular said row from the detecting.

7. A method as described in claim 1, wherein the automatically displaying comprises automatically displaying the indication without navigation through one or more menus.

8. A method as described in claim 1, wherein the note is associated with the at least one object such that subsequent selection of the at least one object causes display of the note.

9. A method as described in claim 1, wherein the note is associated with the at least one object such that display of the at least one object causes display of the note.

10. A method as described in claim 1, wherein the one or more inputs of the note are handwritten.

11. A method comprising:
    recognizing an input as movement over characters displayed in a user interface by a display device of a computing device, the movement intersecting at least one or more rows of characters;
    displaying a visible freeform line in the user interface that corresponds to the movement;
    responsive to the recognizing, indicating selection of the characters by changing display characteristics of the characters, and automatically displaying an indication on the display device that is selectable;
    responsive to selection of the indication, displaying a first portion in the user interface by the computing device that is configured to accept one or more inputs as a note to be associated with at least the characters associated with the movement and a second portion selectable to indicate entry of the note is complete;
    responsive to selection of the second portion, saving the note as associated with the at least one object; and
    responsive to subsequent selection of the indication, causing the displaying of the first and second portions to be displayed again.

12. A method as described in claim 11, wherein the input is one of a touch input or a stylus input.

13. A method as described in claim 11, wherein display characteristics of at least one character that is not associated with the movement are not changed.

14. A method as described in claim 11, wherein the indicating is performed for at least one additional character of a word that includes at least one said character associated with the movement.

15. A method as described in claim 11, further comprising responsive to the recognizing, displaying an indication on the display device proximal to the selected characters that is selectable to cause the displaying of the first and second portions.

16. A method as described in claim 11, wherein the indicating is performed for at least one additional character of a row that includes at least one said character associated with the movement.

17. A system comprising:
    one or more processors; and
    computer executable instructions stored in a memory, the instructions executable to cause the one or more processors to perform operations comprising:
      recognizing an input as selecting at least one object displayed in a user interface by a display device of the system and displaying a visible freeform line in the user interface that corresponds to the input selection of the at least one object;
      responsive to the recognizing, automatically displaying an indication on the display device that is selectable, the indication configured to cease displaying after a time-out period of time;
      responsive to selection of the indication, and prior to expiration of the time-out period of time, displaying a first portion by the system that is configured to accept one or more inputs as a note to be associated with the at least one object and a second portion selectable to indicate entry of the note is complete;
      responsive to selection of the second portion, saving the note as associated with the at least one object; and
      responsive to subsequent selection of the indication, causing the displaying of the first and second portions to be displayed again.

18. A system as described in claim 17, wherein the input is recognized as a touch input or a stylus input detected using touchscreen functionality.

19. A system as described in claim 17, wherein the at least one object includes a plurality of characters arranged as a word and the recognizing includes:
  detecting that the input describes a line drawn over one of the characters of the word but not another one of the characters of the word; and
  ascertaining the selection of the word from the detecting.

20. A system as described in claim 17, wherein the at least one object includes a plurality of rows of characters and the recognizing includes:
  detecting that the input describes a line drawn over at least one of the characters in a particular said row but not another one of the characters of the particular said row; and
  ascertaining the selection of the particular said row from the detecting.

* * * * *